United States Patent [19]

Speier

[11] Patent Number: 5,125,222

[45] Date of Patent: Jun. 30, 1992

[54] LAWN MOWER GRASS CATCHER FRAME FOR AIR IMPERMEABLE BAG

[76] Inventor: Guenter O. Speier, 22912 Cordoba Ct., Salinas, Calif. 93908

[21] Appl. No.: 634,657

[22] Filed: Dec. 27, 1990

[51] Int. Cl.⁵ .......................................... A01D 34/70
[52] U.S. Cl. ...................................... 56/202; 56/13.3; 56/DIG. 8; 56/DIG. 9
[58] Field of Search .............. 56/202, 13.3, 12.8, 56/194, 201, 199, 474, 477, DIG. 8, DIG. 9

[56] References Cited

U.S. PATENT DOCUMENTS

| | | | |
|---|---|---|---|
| 3,492,800 | 2/1970 | Peterson et al. | 56/202 |
| 3,881,304 | 5/1975 | Lempke | 56/202 |
| 3,916,608 | 11/1975 | Garrison | 56/202 |
| 3,984,893 | 10/1976 | Ashley | 56/DIG. 8 X |
| 4,251,982 | 2/1981 | Skaja et al. | 56/202 |
| 4,598,536 | 7/1986 | Langley | 56/202 |

Primary Examiner—Terry Lee Melius
Attorney, Agent, or Firm—Townsend and Townsend

[57] ABSTRACT

In the combination of a rotary lawn mower, an improved mounting for an air impermeable bag is disclosed. The standard rotary lawn mower includes a rotating blade for cutting and blowing grass upwardly, a housing overlying the ground and surrounding the rotating blade for confining the upwardly blown cut grass about the rotating blade, a discharge aperture defined by the housing for permitting the upwardly blown grass to be discharged from the housing in a confined stream of air and cut grass, and an exhaust aperture from the bag for permitting air discharge from the air impermeable bag. The improved mounting for the air impermeable bag includes an underlying support attached to and supported over the ground from the rotatory lawn mower for receiving from above the air impermeable bag and supporting the bag above the ground. A bag stabilizing member fastens to the upper end of the bag at one end and is hinged with respect to the lawn mower at the mount for movement towards and away from the mount. When the bag is inflated during operation of the mower, the bag inflates and the arm pivots from the mount to a bag support position overlying the mount with the bag there between. As a consequence, the inflated bag is securely held to the operating mower during the necessary maneuvering in cutting grass.

2 Claims, 2 Drawing Sheets

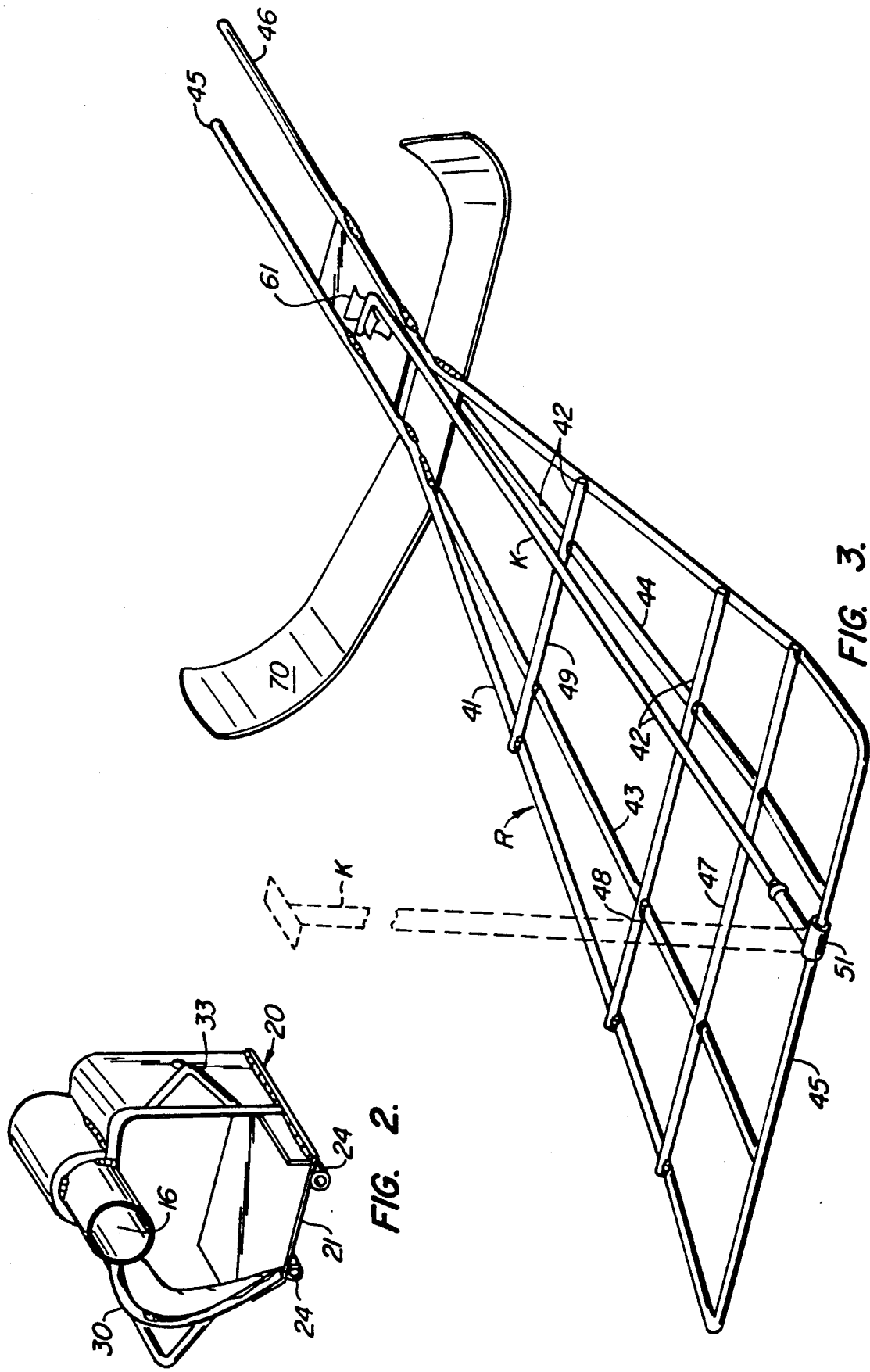

LAWN MOWER GRASS CATCHER FRAME FOR AIR IMPERMEABLE BAG

This invention relates to an improved apparatus for attaching, supporting and stabilizing an air impermeable disposable bag to a rotary lawn mower.

BACKGROUND

Rotary lawn mowers are known which utilize a non-disposable, air permeable bag attachment to catch cut grass and other materials ejected from the lawn mower. Numerous attempts have been made to design and utilize a mounting sufficient for disposable, air impermeable bags to catch the cut grass and other cut materials discharged from rotary mowers.

In order to provide a disposable bag attachment many have done so by utilizing attachments having boxes or baskets which receive in a defined bag hold cavity the air impermeable bag. See for example Seifert et al U.S. Pat. No. 3,890,772; Garrison U.S. Pat. No. 3,916,608; Skaja et al U.S. Pat. No. 4,251,982; Short Sr. U.S. Pat. No. 4,505,095; and Berglund U.S. Pat. No. 4,848,070.

Such bag holding attachments defining cavities have disadvantages. Specifically, they are excessively heavy. They burden the mower to which they are attached with undue weight. Further, the mounts are not collapsible. As a consequence, when they are stored they consume undue space. As mowers not in use are commonly stored in areas of restricted storage space, this constitutes a severe disadvantage. Finally, such mounts defining cavities into which the bag is received require that supported bag to be lifted out of the cavity. This complicates attachment and detachment of the air impermeable bags unnecessarily.

SUMMARY OF THE INVENTION

In the combination of a rotary lawn mower, an improved mounting for an air impermeable bag is disclosed. The standard rotary lawn mower includes a rotating blade for cutting and blowing grass upwardly, a housing overlying the ground and surrounding the rotating blade for confining the upwardly blown cut grass about the rotating blade, a discharge aperture defined by the housing for permitting the upwardly blown grass to be discharged from the housing in a confined stream of air and cut grass, and an exhaust aperture from the bag for permitting air discharge from the air impermeable bag. The improved mounting for the air impermeable bag includes a flat underlying support formed from a grid attached to and supported over the ground from the rotatory lawn mower for receiving from above the air impermeable bag and supporting the bag above the ground. A bag stabilizing member fastens to the upper end of the bag at one end and is hinged with respect to the lawn mower at the mount for movement towards and away from the mount. When the air impermeable bag is inflated during operation of the mower, the bag inflates and the arm pivots from the mount to a bag support position overlying the mount with the bag there between. As a consequence, the inflated bag is securely held to the operating mower during the necessary maneuvering in cutting grass.

OTHER OBJECTS, FEATURES AND ADVANTAGES

Lacking in all prior attempts to support and stabilize a disposable air impermeable bag to a rotary lawn mower have been any measures utilizing a flat underlying support in conjunction with a stabilizing arm which maintains the bag on the flat underlying support during all phases of operation. Such a mount is completely collapsible for convenient storage.

Further, the flat detachable underlying support member of this invention can be fabricated from a flat web of metal rods. Consequently, the disclosed mount can be attached to the rotary lawn mower without burdening the mower with undue weight. This underlying supporting member provides support to the air impermeable plastic bag in order to keep it from contacting the ground.

The flat underlying support, as contemplated by the invention, includes a flat fan shaped surface attached to a bracket which is itself attached to the lawn mower. This support is removable from the bracket. The shape of the support is flat—facilitating attachment and removal of the bag. At the same time, it is rigid enough to support a disposable bag full of grass clippings, but lightweight enough to avoid overloading or otherwise unbalancing the lawn mower/support combination.

The bag stabilizing member is attached by a hinged mechanism at one end to either the underlying support. Such stabilizing member is preferably an elongated rod or similar device which is hinged at its attachment at the lawn mower or support to allow movement in an arc generally perpendicular to the ground.

The bag stabilizing member is attached to the lawn mower for support in such a manner that allows it to pivot freely in a vertical plane with respect to the flat support. When the bag is attached and the mower is operating, the support arm pivots away from the flat support in response to inflation of the disposable bag by air or grass clippings. Even though such inflations has occurred, the support at its hinged attachment prevents movement of the air impermeable bag and its contents relative to the underlying support.

Convenient removable attachment of the air impermeable bag to the pivoting support member can occur. The stabilizing member is attached by a clamp or other method of non-permanent attachment to a bottom corner portion of the disposable air impermeable bag. The attachment to the bag allows for ease of removal of the disposable bag. The attachment however also holds the disposable bag in place during operation and prohibits bag movement in a horizontal direction relative to the flat surface of the underlying support.

Prior to operation the disposable bag will lay deflated upon the support and attached to the stabilizing arm. The stabilizing arm will collapse upon the flat underlying support member with the bag between the arm and the underlying support.

When the lawn mower operates, the bag is initially inflated with air. The bottom corner of the air impermeable bag will remain fastened to the stabilizing arm. The bag will be restricted from excessive horizontal movement over the flat surface of the underlying support. As the bag is filled with grass clippings, the weight of such grass clippings will force the bag down onto the supporting member. The stabilizing arm will continue to prevent horizontal movement of the bag.

When the lawn mower is turned off the bag will deflate of air and rest on the supporting member. The stabilizing member will lay at rest directly on the bag contents. The bag can then be removed from the lawn mower and stabilizing arm for disposal.

BRIEF DESCRIPTION OF THE DRAWINGS

The drawings illustrate the best mode presently contemplated of carrying out the invention:

FIG. 2 is an enlarged perspective detail of the exhaust aperture of the rotary mower showing the simple modification required for the rack of this invention; and, FIG. 3 is a similar perspective view of the mount only without the mower or the attached bag illustrating the simplified construction of the mount.

Referring to FIG. 1 a perspective view of a lawn mower having the invention herein attached is disclosed. Specifically, a mower M having a rotating blade B effects two purposes. First, the grass G is cut. Secondly, the grass G is blown upwardly by the pitch of the blade B.

Figure 1:
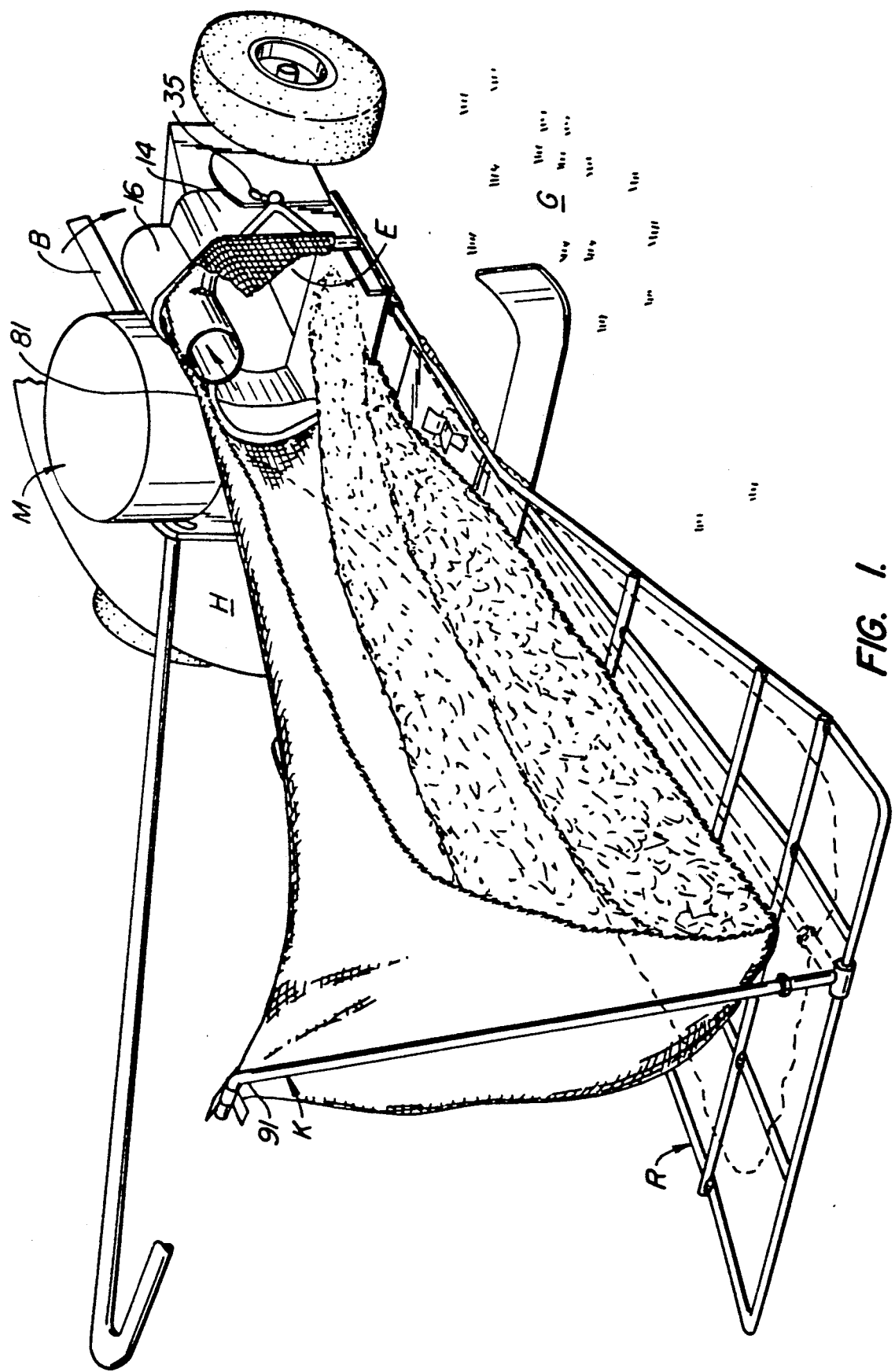
FIG. 1 is a perspective view from the rear of a rotary lawn mower utilizing the mount of this invention, the view illustrating the mower in operation with the bag attached.

A housing H immediately surrounds the rotating blade B. The housing H defines an exhaust aperture E. From this exhaust aperture E therein grass clippings are exhausted.

It will be remembered that an air impermeable disposable bag D is utilized. Accordingly just as air and grass enters the bag D the air without the grass clippings must be able to exit the bag E. Entrance occurs through an aperture 14, exit occurs at an aperture 16. The air flow reverses in the bag depositing the entrained grass debris.

It will be observed that a rack R supports the disposable bag D. At the same time a bracket K holds the upper corner of the disposable bag D. By holding the upper corner of the disposable bag D, bracket K maintains the disposable bag D on the otherwise flat surface of the rod R.

Having generally set forth the operation and construction of this invention with respect to FIG. 1, the detail of the modification of the exhaust aperture E will be set forth with respect to FIG. 2. Finally, and with reference to FIG. 3, the construction and function of the rack will be set forth.

Referring to FIG. 2, exhaust aperture E is shown with a bracket mechanism 20 attached thereto. The mechanism 20 includes a bottom plate 21 having paired tubes 24 fastened at either lower side portion. As will hereinafter be understood these tubes afford the points where the rack R fits in sliding relationship and mounts to the mower M.

The remainder of the construction of bracket R includes a surrounding rod framework 30 which includes an attached exhaust aperture 16. It will be realized that most mowers come equipped with air pervious bags. By including the exhaust aperture 16 in the bracket 20 modification is readily made for the air impermeable disposable bags D.

Attachment of the bracket mechanism 20 is conventional. As can be seen in FIG. 1, wing nuts 35 can attach at bracket portions 33 to effect attachment.

Referring to FIG. 3, the remainder of the apparatus is easily understood. Overall, the flat rack R includes paired rods 41, 42. These respective rods at their ends 45, 46 fit interior of the tubes 24. By fitting interior of the tubes 24, the rack R is securely mounted.

Rods 41, 42 are joined at their end at cross member 45. At the same time, the interior of the surface of the rack R can be provided with rods 43, 44 extending generally parallel to the rods 41, 42. Cross brackets 47, 48, 49 finalize the construction of the generally fan-shaped rack.

A bracket K is shown. In FIG. 3, bracket K is collapsed parallel to the substantially flat surface of rack R.

Bracket K includes two features. Specifically, and at 51 it can be seen that bracket K is mounted for pivotal movement with respect to rear rod 45. This pivotal movement pivots from a position parallel to the rack R (shown in solid lines) to a position at right angles to the rack R shown in broken lines.

Secondly, the bracket K includes a clip 61. It is the function of clip 61 to fasten to the upward corner of the disposable bag D.

Optionally, the rack can include a cradle member 70. Cradle member 70 is spent in a semi-arcuate disposition and functions to keep a fully loaded bag within the otherwise and narrow confines of rack R adjacent the mower M exhaust aperture E. (See FIG. 1)

Operation is simple to understand. Disposable bag D is mounted at its open end 81 to surround both exhaust aperture E in the mower as well as the bag exhaust aperture 16. Bracket K is raised. The bracket at clip 61 fastens to the upper corner 91 the disposable bag D. At this point, the bracket K can be returned to a disposition generally parallel to the planar surface of rack R with the bag attached. As the mower is generally not operating during the attachment of the bag, the bag will collapse.

When the mower is started, the disposable bag D will fill with air. As the bag is filled with air, bracket K will pivot upwardly to the extended support position shown in FIG. 1. From this position it will otherwise support the disposable bag D as it is filled with grass.

The reader will understand that minor modification will of necessity have to be made to adapt the disclosed invention to any of the various sizes of rotary lawn mowers currently or in the future produced. Specifically, the size and shape of the bracket K will be required to establish the requisite fit between the mower on one hand and the disposable bag D on the other hand. Such modification can be made by those having skill in the art.

What is claimed is:

1. In the combination of a rotary lawn mower including; a rotating blade for cutting and blowing grass upwardly to a preselected level above the ground, a housing overlying the ground and surrounding said rotating blade for confining said upwardly blown cut grass about said rotating blade, a discharge aperture defined by said housing for permitting said upwardly blown grass to be discharged from said housing in a confined stream of air and cut grass, an air impermeable bag having an opening for receiving said confined stream of air and cut grass, and means for fastening said bag to the discharge opening of said housing for permitting said confined stream of air and cut grass to enter said bag and air without said cut grass to be discharged from said bag, the improvement in said means for fastening comprising:

an underlying support attached to and supported over said ground from said rotary lawn mower for receiving from above said air impermeable bag and supporting said bag above the ground;

a bag stabilizing member having first and second ends for movement over said underlying support;

said first end of said bag stabilizing member hinged with respect to said underlying support for movement at said second end of said bag stabilizing member in an arcuate path overlying said underlying support; and, means for fastening said second end of said bag stabilizing member to said bag for maintaining said bag at said point of attachment over said underlying support whereby said bag follows said underlying support during movement of said rotary lawn mower.

2. The combination of claim 1 and wherein said second end of said bag stabilizing member includes a clip for attachment to said bag.

* * * * *